United States Patent [19]

Giannelis et al.

[11] Patent Number: 5,219,611
[45] Date of Patent: Jun. 15, 1993

[54] PREPARING DENSIFIED LOW POROSITY TITANIA SOL GEL FORMS

[75] Inventors: Emmanuel P. Giannelis; Joseph L. Keddie, both of Ithaca, N.Y.

[73] Assignee: Cornell Research Foundation, Inc., Ithaca, N.Y.

[21] Appl. No.: 767,471

[22] Filed: Sep. 30, 1991

[51] Int. Cl.$^5$ .............. B05D 5/06; B05D 3/02; C01G 23/053
[52] U.S. Cl. ............ 427/162; 423/62; 423/85; 427/64; 427/79; 427/80; 427/108; 427/126.2; 427/126.3; 427/164; 427/165; 427/222; 427/398.1; 427/419.3
[58] Field of Search .......... 427/226, 79, 80, 64, 427/108, 126.3, 126.2, 162, 165, 398.1, 164, 419.3; 423/85, 62

[56] References Cited

U.S. PATENT DOCUMENTS

| | | | |
|---|---|---|---|
| 4,272,588 | 6/1981 | Yoldas et al. | 427/162 |
| 4,361,598 | 11/1982 | Yoldas | 427/106 |
| 4,704,299 | 11/1987 | Wielonski et al. | 427/38 |
| 4,738,896 | 4/1988 | Stevens | 428/315.9 |
| 4,765,729 | 8/1988 | Taniguchi | 427/164 |
| 4,789,563 | 12/1988 | Stevens | 427/252 |
| 4,814,202 | 3/1989 | Castelas | 427/244 |
| 4,827,870 | 5/1989 | Lee | 118/665 |
| 4,830,879 | 5/1989 | Debsikdar | 427/164 |
| 4,839,402 | 6/1989 | Stevens | 523/200 |
| 4,921,731 | 5/1990 | Clark et al. | 427/314 |
| 4,929,278 | 5/1990 | Ashley et al. | 106/287.12 |
| 4,935,296 | 6/1990 | Stevens | 428/288 |
| 4,965,091 | 10/1990 | Fratello et al. | 427/126.2 |
| 4,966,812 | 10/1990 | Ashley et al. | 427/162 |

OTHER PUBLICATIONS

Ceramic Bulletin, vol. 69, No. 9, pp. 1450–1451, 1990.
Ceramic Bulletin, vol. 70, No. 3, p. 533, 1991.
Ceramic Bulletin, vol. 70, No. 9, p. 1450, 1991.
Cornell Chronicle, vol. 22, No. 6, pp. 1 and 8, "New Technique yields better displays", Oct. 4, 1990.
Keddie, J. L., et al., "Effect of Heating Rate on the Sintering of TiO$_2$ Thin Films: Competition Between Densification and Crystallization," presentation at 93rd Annual Meeting of the American Ceramic Society, May 2, 1991.
Better Ceramics Through Chemistry IV, Materials Research Society Proceedings, vol. 180, 383–386 (1990).

Primary Examiner—Janyce Bell

[57] ABSTRACT

Low porosity titania forms containing only a small amount of hydroxyl groups and possessing a high refractive index which are property stable regardless of humidity level and which prohibit electrical and gas leakage and optical loss, are obtained in a sol-gel process by rapidly heating to curing temperature, e.g. at a rate of 8000° C./min. One application provides more stable, longer-lasting sol-gel prepared optical interference filters. Other applications provide capacitors with high capacitance and optical planar waveguides.

6 Claims, 2 Drawing Sheets

FIG. I

PREPARING DENSIFIED LOW POROSITY TITANIA SOL GEL FORMS

FIELD OF THE INVENTION

This invention is related to the sol-gel preparation of uniformly and highly dense titania forms. In one embodiment, this invention relates to sol-gel preparation of optical interference filters. In other embodiments, this invention relates to sol-gel preparation of capacitors and to sol-gel preparation of planar waveguides.

BACKGROUND OF THE INVENTION

Titania films having densities ranging up to 70% of theoretical density and containing a relatively large amount of uncured hydroxyl groups have been prepared by sol-gel processing. These films have the disadvantage of being relatively highly porous because they contain Void volume. Because of the presence of the large amount of uncured hydroxyl groups and the high porosity, the films absorb moisture resulting in property variation as a function of moisture level and eventual deterioration, and allow electrical and gas leakage and optical loss.

SUMMARY OF THE INVENTION

It is an object of this invention to provide sol-gel preparation of uniformly and highly dense low porosity titania forms containing only a small amount of hydroxyl groups and possessing a high refractive index, which do not absorb moisture and thus are property stable regardless of humidity level and resistant to humidity induced deterioration and which prohibit electrical and gas leakage and optical loss.

The method here in for preparing a titanium dioxide film or monolith having a substantially uniform density of at least 80% of theoretical density comprises the steps of (a) preparing a solution of titanium alkoxide in solvent, said titanium alkoxide having the formula $Ti(OR)_4$ wherein R is alkyl containing 1 to 6 carbon atoms, said solvent comprising that selected from the group consisting of aliphatic, cycloaliphatic and aromatic compounds containing from 1 to 20 carbon atoms and at least one functional group consisting of ether and hydroxyl, (b) admixing water in an amount ranging from that stoichiometrically equivalent to one alkoxide group of each alkoxide molecule to that stoichiometrically equivalent to all the alkoxide groups of each alkoxide molecule and heating at a temperature ranging from 10° to 70° C. for a time period ranging from 0.5 to 48 hours to cause hydrolysis and condensation and diluting with said solvent if necessary, to thereby prepare a formable sol, (c) forming formable sol from step (b) into a film or monolith, (d) curing said film or monolith by heating to a temperature ranging from 400° to 900° C. at a rate exceeding 1000° C./min, maintaining this temperature for 1 second to 60 minutes, and then cooling to room temperature.

The method herein for preparing an optical interference filter comprises the steps of (a) preparing an $SiO_2$ sol by steps comprising (i) preparing a solution of silicon alkoxide in solvent, said silicon alkoxide having the formula $Si(OR')_nQ_m$ wherein R' is $C_1$-$C_6$ alkyl and Q is selected from the group consisting of $C_1$-$C_{20}$ alkyl, $C_2$-$C_4$ alkenyl, phenyl and hydrogen and n is 3 or 4 and m is $4-n$, said solvent comprising that selected from the group consisting of aliphatic, cycloaliphatic or aromatic compound containing from 1 to 20 carbon atoms and at least one functional group selected from the group consisting of ether and hydroxyl, and (ii) admixing water with said solution in an amount ranging from that stoichiometrically equivalent to one alkoxide group of each alkoxide molecule to that stoichiometrically equivalent to all the alkoxide groups of each alkoxide molecule, (b) preparing a $TiO_2$ sol by steps comprising (i) preparing a solution of titanium alkoxide in solvent, said titanium alkoxide having the formula $Ti(OR)_4$ wherein R is alkyl containing from 1 to 6 carbon atoms, said solvent comprising that selected from the group consisting of aliphatic, cycloaliphatic and aromatic compounds containing from 1 to 20 carbon atoms and at least one functional group consisting of ether and hydroxyl, and (ii) admixing water with said solution in an amount ranging from that stoichiometrically equivalent to one alkoxide group of each alkoxide molecule to that stoichiometrically equivalent to all the alkoxide groups of each alkoxide molecule, (c) alternately depositing a layer of sol of step a) and a layer of sol of step (b) and heating each deposited layer at a temperature ranging from 75° to 200° C. for a time period ranging from 0.5 minutes to 2 hours to cause reaction to the degree that there is no dissolution into or intermixing with the next layer deposited, (d) after each pair of depositions, annealing the pair of deposited layers by heating to a temperature ranging from 400° to 900° C. at a rate exceeding 1000° C./min, maintaining this temperature for 1 second to 60 minutes and then cooling to room temperature.

The method herein for preparing a capacitor comprises the steps of (a) preparing a solution of titanium alkoxide in solvent, said titanium alkoxide having the formula $Ti(OR)_4$, wherein R is alkyl containing from 1 to 6 carbon atoms, said solvent comprising that selected from the group consisting of aliphatic, cycloaliphatic and aromatic compounds containing from 1 to 20 carbon atoms and at least one functional group selected from the group consisting of ether and hydroxyl, (b) admixing water with said solution in an amount ranging from that stoichiometrically equivalent to one alkoxide group of each alkoxide molecule to that stoichiometrically equivalent to all the alkoxide groups of each alkoxide molecule and heating at a temperature ranging from 10° C. to 70° C. for a time period ranging from 0.5 to 48 hours to cause hydrolysis and condensation and diluting with said solvent if necessary, to prepare a formable sol, (c) depositing a layer of the sol of step (b) on a platinum metal layer, (d) curing said layer of sol by heating to a temperature ranging from 400° C. to 900° C. at a rate exceeding 1000° C./min, maintaining this temperature for 1 second to 60 minutes, and then cooling to room temperature.

The method herein for preparing a planar optical waveguide comprises the steps of (a) preparing a solution of titanium alkoxide in solvent, said titanium alkoxide having the formula $Ti(OR)_4$ wherein R is alkyl containing from 1 to 6 carbon atoms, said solvent comprising that selected from the group consisting of aliphatic, cycloaliphatic and aromatic compounds containing from 1 to 20 carbon atoms and at least one functional group selected from the group consisting of ether and hydroxyl, (b) admixing water with said solution in an amount ranging from that stoichiometrically equivalent to one alkoxide group of each alkoxide molecule to that stoichiometrically equivalent to all the alkoxide groups of each alkoxide molecule and heating at a temperature ranging from 10° C. to 70° C. for a time period ranging from 0.5 to 48 hours to cause hydrolysis and condensation and diluting with said solvent if necessary, to prepare a formable sol, (c) depositing a layer of the sol of step (b) on a layer of silicon dioxide on a wafer, (d) curing said layer of sol by heating to a temperature ranging from 400° C. to 900° C. at a rate exceeding 1000° C./min, maintaining this temperature for 1 second to 60 minutes, and then cooling to room temperature.

The term "uniform density" is used herein to mean substantially homogeneous on a scale of 50 nm.

The term "theoretical density" is used herein to mean the highest attainable density of a fully dense, 100% crystalline material and is expressed in number of atoms per cubic meter. This is $2.89 \times 10^{28}$ titanium atoms/m$^3$ for anatase.

The term "formable sol" is used herein to mean a sol with a viscosity such as not to be so fluid as not to be able to form a film on a substrate or be retained in a mold and such as not to be so viscous as not to form a desired layer or shape on depositing without application of extrinsic shaping force.

DETAILED DESCRIPTION OF THE INVENTION

Figure 1:
FIG. 1 is a photomicrograph of representative microstructure of titania layer formed by the process of the invention herein, magnified to 200,000×, with the bar indicating a distance of 50 nm.

We turn firstly to the details of the method for preparing a titanium dioxide film or monolith of substantially uniform high density.

The titanium alkoxides of step (a) are readily prepared by known methods, e.g. by reaction of titanium chloride with an appropriate alcohol. Titanium $C_{2-4}$ alkoxides (e.g. titanium(IV) ethoxide, Titanium(IV) n-propoxide, titanium(IV) i-propoxide, titanium(IV) n-butoxide, titanium(IV) s-butoxide, and titanium(IV) t-butoxide) are preferred and are commercially available. Other suitable alkoxides include, for example, titanium(IV) isoamyloxide and titanium(IV) n-capryloxide.

Turning now to the solvent for step (a), $C_2$–$C_5$ saturated or unsaturated alcohols are preferred. Such alcohols include, for example, ethanol, n-propanol, 2-propanol, n-butanol, sec-butanol, t-butanol, vinyl alcohol, allyl alcohol, crotyl alcohol, 1-butene-4-ol and 3-butene-2-ol. Other suitable solvents include, for example, methanol, cyclohexanol, dibutylether, phenol, benzyl alcohol, tetrahydrafuran and dodecanol.

When titanium(IV) ethoxide is the titanium alkoxide, it is preferred that the solvent is t-butanol. The presence of the t-butanol delays gelation of the sol and viscosity increase in step (b) to the point where forming is readily carried out in step (c).

Typically the solvent amounts to from about 40% to about 90% by volume of the solution prepared in step (a). Where in this range is operative and preferred depends on the particular solvent used and the particular alkoxy groups present. More solvent fosters dissolving (i.e. no precipitation) and thinner films.

In step (b), the water is preferably added as a solution with $C_2$–$C_4$ alcohol, e.g. as a solution containing from 0.5 to 10 volume percent water with the remainder being alcohol. The alcohol functions as a diluent to lower the local concentration of the water admixed in step (a) so that precipitation does not occur.

Acid is optionally used in step (b), e.g. at a level of 0.001 to 2 moles per mole of alkoxide. Preferred acids are hydrochloric acid, nitric acid and acetic acid.

Preferably, the heating in step (b) is at a temperature ranging from 25° C. to 65° C. for a time period ranging from 0.75 to 2.5 hours.

The end point for the reaction of step (b) is readily determined empirically by trial utilizing the forming method selected for step (c). If the reaction product is too viscous for the forming method, the viscosity level is readily lowered to a suitable level, i.e., viscous enough to produce a thick enough film but not so viscous as to provide a non-uniform thickness layer, by admixture of more solvent, preferably the same as used in step (a).

Before carrying out step (c), the product of step (b) is preferably filtered, e.g. through a 0.20 μm filter to remove any particulates.

Step (c) is readily carried out to form a film on a substrate, e.g. by dip coating, spraying or smearing. A preferred film deposition method is by spin casting on a substrate, e.g. using photoresist spinning means, by pouring the formable sol on the substrate, and spinning at 1000 to 6000 rpm. Examples of substrates include those of metals (e.g. steel), non-metals (e.g. silicon wafers), ceramics (e.g. MgO, quartz), glass (e.g. barium-strontium glass) and polymers (e.g. polycarbonate). The substrates are preferably cleaned before depositing of the film by immersion in solvents with or without ultrasonic treatment. For example, silicon wafers are cleaned by stripping of native oxide by immersion in HF, followed by cleaning by immersion in a solution of methanol and acetone. Barium-strontium glass substrates are readily cleaned by successive immersions in trichlorofuoroethane, nitric acid, and a solution of methanol and acetone, each in an ultrasonic bath. The thickness of the film deposited depends on the ultimate thickness desired on conclusion of step (d). Normally, the thickness obtained in step (d) is normally 30 to 70% of that of a film as deposited in step (c).

Step (c) is readily carried out to form a monolith, e.g. by casting or molding.

We turn now to step (d). Preferably, the heating is to a temperature ranging from 700° to 800° C. and is carried out at a rate exceeding 7500° C./min. Heating rates up to 8000° C./min are readily carried out utilizing a rapid thermal annealer (e.g. available under the name Heatpulse 410, from AG Associates of Sunnyvale, Calif.) Once obtained, the temperature is preferably maintained for 1 to 5 minutes. The method of cooling to room temperature is uncritical. Preferably, however, cooling is at the same rate as the heating rate; this is readily carried out by using water and gas cooling means that are incorporated in the above-named rapid thermal annealer. Step (d) is preferably carried out in the presence of a source of oxygen (e.g. air or flowing $O_2$) to burn off organic matter. If the presence of organic matter is acceptable, step (d) can be carried out in the presence of an inert gas, such as nitrogen.

The end point of the curing step is readily established by a density determination on the product. Heating in step (d) is carried out for a time period to obtain a packing density in terms of titanium atoms/$m^3$ which is at least 80% of theoretical. Preferred goals to be obtained in step (d) are a number of hydroxyl groups defined by a hydrogen density of less than $4.0 \times 10^{27}$ atoms/$m^3$, a refractive index of at least 2.2, an H/Ti atomic ratio of 0.15 or less, and a film thickness at least 30% less than the as deposited thickness.

Thicknesses of films obtained at the conclusion of step (d) normally range from 0.01 microns up to 10 microns or more.

The titania films obtained in the present invention are useful for protective coatings, e.g. for corrosion protection, or as an oxidation barrier, or in planar waveguides, or as dielectric films, for example in capacitors with high capacitance, or as antireflective coatings. In these uses the low porosity of the titania film provides barrier properties, to protect against gases (e.g. to protect against oxidation) or corrosive chemicals or diffusion or electrical or optical loss. This low porosity property resulting from the instant method is novel in sol-gel produced titania films. This low porosity property resulting from the instant method provides films with a high dielectric constant and a high refractive index, unattainable by previous methods.

The titania monoliths obtained in the present invention are useful, for example, in the production of objects for use in large lenses.

The rapid heating rate in step (d) has been found to be critical to obtaining the low porosity result. In normal sol-gel processing, a slow heating rate, e.g. 0.1 to 10° C./min, is considered important to prevent cracking. Thus, the fast heating rate utilized in the present invention is unobvious.

We turn now to the method herein for preparing an optical interference filter.

Optical interference filters are utilized to reflect or absorb light at selected wavelengths and to transmit light that is normal to the filter and to exclude light at certain wavelengths at an angle to the filter. They are used to eliminate the halo effect otherwise produced by cathode ray tube screens.

These optical filters normally contain alternating layers of silica and titania atop of glass and normally contain from 8 to 20 or more total layers. Commercial filters ordinarily contain 16 to 18 total layers (8 or 9 each of silica and titania).

Typically the alternating layers of optical filters have been made by sputtering or chemical vapor deposition. Ceramic Bulletin, Vol. 69, No. 9, 1450–1451 (1990) discloses a process by the instant inventors for preparing the alternating layers in an optical interference filter by a sol-gel technique.

Prior to the present invention sol-gel processing has resulted in highly porous titania layers in the optical filter. This high porosity results in humidity absorption and consequent change in filtering properties with humidity level and deterioration at a faster rate than if the pores in the high porosity titania layers were not present to absorb moisture. The application of the instant invention to sol-gel processing of titania layers in optical interference filters cures this problem. In addition, the low porosity resulting from the process herein provides a high refractive index unattainable by previous methods.

We turn now to the method herein for preparing an optical interference filter.

We turn now to step (a) of the optical interference filter preparing method herein.

The silicon alkoxide of step (a) preferably has the formula above where R' is $C_2$–$C_4$ alkyl and n is 4. Silicon alkoxides in this group include tetraethylorthosilicate, tetrapropylorthosilicate and tetrabutylorthosilicate. Other suitable silicon alkoxides include, for example, tetramethylorthosilicate, methyltriethoxysilane, octadecyltriethoxysilicate, vinyltriethoxy silane, allyltriethoxysilane, phenyltriethoxysilane, and triethoxysilane. The aforementioned are commercially available. Other compounds represented by the above formula for silicon alkoxides are prepared in similar fashion to their homologs or are prepared as described in the 3-volume work, "Organosilicon Compounds", by V. Bazant, V. Chvalovsky and J. Rathovsky, Academic Press, N.Y. 1965. The ethoxy compounds are more preferred. They are less toxic than the corresponding methoxy compounds and faster reacting than corresponding propoxy, butoxy and higher homolog compounds. Tetraethylorthosilicate is most preferred.

The solvent for use in step (a) of the optical interference preparing method herein is the same as that described above for use in preparing titania sols in the method for preparing a titanium dioxide film or monolith of uniform high density (low porosity).

In step (a) of the optical interference filter preparing method herein, the water is preferably added in the form of a solution with $C_2$–$C_4$ alcohol, that is as a solution containing from 0.5 to 40 volume percent water with the remainder being alcohol.

Acid is optionally used in step (a) of the optical interference filter preparing method herein, e.g. at a level of 0.001 to 2 moles per mole of alkoxide. Preferred acids are hydrochloric acid, nitric acid and acetic acid.

We turn now to step (b) of the method herein for preparing an optical interference filter.

The solution formation of step (b) of the optical interference filter preparing method herein is the same as step (a) in the method for preparing a titanium dioxide film or monolith of uniform high density (low porosity) described above. When the method of layer deposition in step (c) of the optical interference filter preparing method herein is spin casting, inclusion 10 to 40 volume percent of toluene in the solvent eliminates bubble formation that may otherwise occur during spinning of the $TiO_2$ sol which may cause some flaws. As in step (b) described above for the method for use in preparing a titanium dioxide film or monolith of uniform high density (low porosity), the water in step (b) of the optical interference method herein is preferably added as a solution containing from 99.5 to 90 volume percent $C_2$–$C_4$ alcohol (with the remainder being water), and acid (preferably hydrochloric acid, nitric acid or acetic acid) is optionally used at a level of 0.001 to 2 moles per mole of alkoxide.

We turn now to Step (c) of the method herein for preparing an optical interference filter. The sols for depositing preferably are filtered through 0.2 $\mu$M filters to remove particulates prior to depositing. The depositing can be carried out by dip coating or spraying or smearing but preferably by spin casting at 1000 to 6000 rpm as described above. The initial layer is deposited on a substrate which can be of glass (e.g. barium-strontium glass) or quartz and successive layers are then deposited serially. Each layer has an as deposited thickness ranging from 40 to 300 nm. Normally 8 to 20 or more layers are deposited (4 to 10 or more of each of silica and titania). Each layer, after depositing, is preferably heated at a temperature ranging from 140° C. to 160° C. for a time period ranging from 1 minute to 60 minutes.

We turn now to step (d) of the method herein for preparing an optical interference filter. Preferably the heating is to a temperature ranging from 700° to 800° C. and is carried out at a rate exceeding 7500° C./min (e.g. 8000° C./min) in rapid thermal annealing apparatus as described above and the temperature is preferably maintained for 1 to 5 minutes. The method of cooling to room temperature is uncritical. Preferably, however, cooling is at the same rate as the heating rate; this is readily carried out by using water and gas cooling means that are incorporated in the above-named thermal annealer. This step is preferably carried out in the presence of a source of oxygen (e.g. air or flowing $O_2$) to burn off organic matter. The end point of this step (d) is readily established by a density determination on a titania layer and heating in this step (d) is carried out for a time period to obtain a packing density in terms of titanium atoms/$m^3$ which is at least 80% of theoretical. While the rapid heating rate in this step (d) is critical to forming non-porous titania layers, it is not critical to forming non-porous silica layers as conventional heating rates (e.g. 1° C./min) provide silica layers of high density and low porosity. The final thicknesses of the deposited layers typically range from 700 to 1000 angstroms.

We turn now to the method herein for preparing a capacitor. The preferred conditions for steps (a), (b) and (d) are the same as those set forth above for preparing a titanium dioxide film or monolith of substantially uniform high density. In step (c), the formable sol of step (b) is deposited by dip coating, spraying or smearing but preferably by spin casting as described previously in a layer having a thickness as described previously for step (c) of the method of forming a titanium dioxide film of substantially uniform high density. The depositing is on a platinum layer which is atop a wafer made, for example, of silicon or germanium or silicon/germanium, with a layer of titanium optionally between the platinum layer and the wafer. Preferably the platinum metal layer has a thickness ranging from 10 nm to 1000 nm and the titanium metal layer has a thickness ranging from 10 nm to 1000 nm. The platinum metal layer can be deposited, e.g. by sputtering or electron beam evaporation and the titanium metal layer can be deposited, e.g. by sputtering or electron beam evaporation. After step (d), the capacitor is completed by depositing of the top electrode atop the cured titania layer, e.g. by depositing of a 10 nm to 1000 nm thickness layer of platinum metal on top of the titania layer, e.g. by sputtering or electron beam evaporation.

We turn now to the method herein for preparing a planar waveguide. The preferred conditions for steps (a), (b) and (d) are the same as the preferred conditions for these steps in the method herein for preparing a titanium film or monolith of substantially uniform high density. Step (c) is readily carried out by dip coating, smearing or spraying a layer of the formable sol but preferably is carried out by spin casting as described above. The layer formed in step (c) preferably has a thickness as described previously for step (c) of the method for forming a titanium dioxide film of substantially uniform thickness. The wafer is composed, e.g. of silicon or germanium or silicon/germanium or gallum arsenide. The silicon dioxide layer on the wafer preferably has a thickness ranging from 10 nm to 1000 nm and is preferably deposited by chemical vapor deposition.

The following invention is illustrated by the following Examples:

EXAMPLE I

A sol was prepared as follows: 3 ml of commercially obtained titanium(IV) ethoxide was dissolved in 50 ml of t-butanol and heating was carried out at 40° C. for 2 hours. Then a solution of t-butanol and water (0.63 ml water and 15 ml t-butanol) was added dropwise to the stirring alkoxide solution. The total water added provided a molar ratio of water to titanium ethoxide of 2.45:1. After the water addition, the sol was stirred for 2.5 hours in a closed flask at 40° C. The sol was then spun-cast at 2000 rpm onto 3-inch diameter, 0.02 inch thick silicon wafers (2 ml sol/wafer) which had been stripped of native oxide in HF (10 vol %) and cleaned with methanol and acetone. The deposited film was heated in a rapid thermal annealer equipped with a thermocouple at the rate of 8000° C./min to 750° C. and held there for 5 minutes, then cooled at the same rate as heated, all in the presence of flowing $O_2$. The cured titania layer was determined to have a substantially uniform density of 81% of theoretical.

For comparative purposes, other runs were carried out the same as above but with heating rates of 0.2° C./min, 1.0° C./min, 10.0° C./min, 20.0° C./min and 70.0° C./min.

Results of all the runs are shown in the following table:

TABLE 1

| Heating Rate (°C./min) | Titanium Density ($10^{28}$ atoms/$m^3$) | Hydrogen Density ($10^{27}$ H atoms/$m^3$) |
| --- | --- | --- |
| As deposited | 1.30 | 10.6 |
| 0.2 | 1.67 | 5.3 |
| 1.0 | 1.70 | 5.4 |
| 10.0 | 1.87 | 5.0 |
| 20.0 | 1.82 | 5.1 |
| 70.0 | 2.02 | 3.7 |
| $8 \times 10^3$ | 2.29 | 3.8 |

| Heating Rate (°C./min) | Refractive Index | H/Ti Atomic Ratio | Thickness (angstroms) |
| --- | --- | --- | --- |
| As deposited | 1.878 | 0.82 | 1065 |
| 0.2 | 1.980 | 0.31 | 831 |
| 1.0 | 1.965 | 0.31 | 831 |
| 10.0 | 2.013 | 0.27 | 776 |
| 20.0 | 2.026 | 0.28 | 762 |
| 70.0 | 2.195 | 0.18 | 681 |
| $8 \times 10^3$ | 2.302 | 0.14 | 611 |

Magnification of the structure of the film produced using the heating rate of 8000° C./min is represented in FIG. 1 which shows uniform high density (non-porous) structure.

Figure 2:
FIG. 2 is a photomicrograph of representative microstructure of titania layer formed in a sol-gel process where heating to curing temperature was at a rate of 0.2° C./min, magnified to 200,000×, with the bar indicating a distance of 50 nm.

Magnification of the structure of the film produced using the heating rate of 0.2° C./min is represented in FIG. 2 which shows a non-uniform porous structure (with pores between and inside crystals).

EXAMPLE II

A sol was prepared as follows: 10.5 ml of titanium-(IV) isopropoxide was dissolved in 15 ml of isopropanol and 1.67 ml of concentrated HCl. Then 0.63 ml of water (1 mole water per mole titanium isopropoxide) in 15 ml of isopropanol was added dropwise to the stirring acidified alkoxide solution. Stirring was continued for one hour. The resulting sol was diluted with 1 part by volume isopropanol to 2 parts by volume sol and the diluted sol was spun-cast at 2000 rpm onto 3-inch diameter, 0.02 inch thick silicon wafers (2 ml sol/wafer). The deposited film was heated in a rapid thermal annealer equipped with a thermocouple, at the rate of 8000° C./min to 750° C. and held there for 5 minutes, then cooled at the same rate as heated, all in the presence of flowing oxygen. The resulting cured titania layer has a substantially uniform density of 98% of theoretical. In contrast, amorphous $TiO_2$ films prepared from titanium-(IV) isopropoxide, when heated to curing temperature of 750° C. at a rate of 1° C./min have a porous structure and were determined to attain an average density of 70% of theoretical.

EXAMPLE III

An optical interference filter is prepared as follows:

A silica sol is prepared as follows: Tetraethylorthosilicate (8.6 ml) is dissolved in 4.3 ml ethanol. Then 0.08 ml of concentrated HCl and 2 ml of water (4 moles water per mole tetraethylorthosilicate) in 4.3 ml ethanol is added dropwise to the stirring alkoxide solution. The resulting sol is maintained at room temperature for 2 hours and subsequently is diluted with 40 ml of ethanol.

A titania sol is prepared as follows: Titanium(IV) isopropoxide (10.5 ml) is dissolved in 15 ml of isopropyl alcohol. Then 1.67 ml of concentrated hydrochloric acid (1.8 moles HCl per mole of alkoxide) is admixed. Then 0.63 ml of deionized water in 15 ml of isopropanol (1 mole of water per mole of alkoxide) is added dropwise to the stirring acidified alkoxide solution. Stirring is continued for hour at room temperature. The resulting titania sol is diluted by adding 15 ml of ispropanol and 5 ml toluene. The diluted sol is filtered through a 0.2 μm filter to remove any particulates.

The $SiO_2$ and $TiO_2$ sols are alternately spun cast at 2000 rpm on one-inch diameter, 0.2 inch thick barium-strontium glass substrates which have been cleaned by successive immersion in trichlorotrifluoroethane, nitric acid and a solution of methanol and acetone, each in an ultrasonic bath. Twelve alternating layers are deposited with the one adjacent the glass being $SiO_2$.

After each layer is deposited, it is heated at 150° C. by placing in an oven for 15 minutes.

After each pair of depositions, curing is carried out in a rapid thermal annealer equipped with a thermocouple by heating at a rate of 8000° C./min to 750° C. and holding there for 5 minutes, then cooling at the same rate as the heating rate, all in the presence of flowing oxygen.

Both the titania and silica layers in the resulting product are non-porous. The titania layers have substantially uniform densities which are at least 95% of theoretical.

EXAMPLE IV

A capacitor is prepared as follows:

A titania sol is prepared as in Example II. The sol is spuncast at 2000 rpm onto the platinum metal layer of a silicon substrate coated with a 200 nm layer of platinum. Curing is carried out by heating the deposited film in a rapid thermal annealer equipped with a thermocouple at a rate of 8000° C./min to 750° C., holding at 750° C. for 5 minutes, then cooling at the same rate as heated, all in the presence of flowing $O_2$. The titania layer in the resulting structure is nonporous and has a density which is 98% of theoretical. A 200 nm layer of platinum is then applied for the top electrode.

EXAMPLE V

A planar waveguide is prepared as follows: Processing is carried out the same as in Example II except that the wafer is made of silicon coated with a 1000 angstrom layer of silicon dioxide and deposition of the titania sol is on the silicon dioxide layer. The titania layer in the resulting structure is nonporous and has a density which is 98% of theoretical.

Many variations will be obvious to those skilled in the art. Therefore, the invention is defined by the claims.

What is claimed is:

1. A method of preparing a titanium dioxide film or monolith having a substantially uniform density of at least 80% of theoretical density, said method comprising the steps of
   (a) preparing a solution of titanium alkoxide in solvent, said titanium alkoxide having the formula $Ti(OR)_4$ wherein R is alkyl containing from 1 to 6 carbon atoms, said solvent comprising that selected from the group consisting of aliphatic, cycloaliphatic and aromatic compounds containing from 1 to 20 carbon atoms and at least one functional group selected from the group consisting of ether and hydroxyl,
   (b) admixing water in an amount ranging from that stoichiometrically equivalent to one alkoxide group of each alkoxide molecule to that stoichiometrically equivalent to all the alkoxide groups of each alkoxide molecule and maintaining a temperature ranging from 10° C. to 70° C. for a time period ranging from 0.5 to 48 hours to cause hydrolysis and condensation and diluting with said solvent if necessary, to prepare a formable sol,
   (c) forming formable sol of step (b) into a film or monolith,
   (d) curing said film or monolith by heating said film or monolith to a temperature ranging from 400° C. to 900° C. at a rate exceeding 1000° C./min, maintaining this temperature for 1 second to 60 minutes, and then cooling to room temperature.

2. The method of claim 1 wherein said titanium alkoxide has the formula $Ti(OR)_4$ wherein R contains from 2 to 4 carbon atoms and wherein the solvent in step (a) comprises solvent selected from the group consisting of $C_2$-$C_4$ alcohols, wherein the temperature in step (b) is maintained at 25° C. to 65° C. for a time period ranging from 0.75 to 2.5 hours, wherein a film is formed in step (c) and wherein curing in step (d) is carried out by heating to a temperature ranging from 700° C. to 800° C. at a rate exceeding 7500° C./min and maintaining this temperature for 1 to 5 minutes.

3. The method of claim 2 wherein reaction in step (b) is catalyzed with acid in a molar ratio of acid to alkoxide ranging from 0.001:1 to 2:1.

4. A method of preparing an optical interference filter comprising multiple alternating layers of $SiO_2$ and $TiO_2$, said method comprising the steps of
   (a) preparing an $SiO_2$ sol by steps comprising (i) preparing a solution of silicon alkoxide in solvent, said silicon alkoxide having the formula $Si(OR')_nQ_m$ wherein R' is $C_1$-$C_6$ alkyl and Q is selected from the group consisting of $C_1$-$C_{20}$ alkyl, $C_2$-$C_4$ alkenyl, phenyl and hydrogen and n is 3 or 4 and m is 4-n, said solvent comprising that selected from the group consisting of aliphatic, cycloaliphatic or aromatic compound containing from 1 to 20 carbon atoms and at least one functional group selected from the group consisting of ether and hydroxyl, and (ii) admixing water with said solution in an amount ranging from that stoichiometrically equivalent to one alkoxide group of each alkoxide molecule to that stoichiometrically equivalent to all the alkoxide groups of each alkoxide molecule, (b) preparing a $TiO_2$ sol by steps comprising (i) preparing a solution of titanium alkoxide in solvent, said titanium alkoxide having the formula $Ti(OR)_4$ wherein R is alkyl containing from 1 to 6 carbon atoms, said solvent comprising that selected from the group consisting of aliphatic, cycloaliphatic and aromatic compounds containing from 1 to 20 carbon atoms and at least one functional group selected from the group consisting of ether and hydroxyl, and (ii) admixing water with said solution in an amount ranging from that stoichiometrically equivalent to one alkoxide group of each alkoxide molecule to that stoichiometrically equivalent to all the alkoxide groups of each alkoxide molecule, (c) alternately depositing a layer of the sol of step (a) and a layer of the sol of step (b) and heating each deposited layer at a temperature ranging from 75° C. to 200° C. for a time period ranging from 0.5 minutes to 2 hours, (d) after each pair of depositions, curing the pair of deposited layers by heating to a temperature ranging from 400° C. to 900° C. at a rate exceeding 1000° C./min, maintaining this temperature for 1 second to 60 minutes and then cooling to room temperature.

5. The method of claim 4 wherein in step (a) the silicon alkoxide is tetraorthosilicate and the solvent is ethanol, wherein in step (b) the titanium alkoxide is titanium(IV) isopropoxide and the solvent comprises isopropanol, wherein in step (c) the heating is at 140° C. to 160° C., and wherein in step (d), heating is to a temperature ranging from 700° C. to 800° C. at a rate exceeding 7500° C./min and this temperature is maintained for 1 to 5 minutes.

6. The method of claim 5 wherein the total solvent used in step (b) consists of from 90 to 60% by volume isopropanol and from 10 to 40% by volume toluene.

* * * * *